March 19, 1935.  G. H. ENNIS  1,994,762
ELECTROLYTE FOR USE IN TESTING WELLS
Original Filed June 3, 1929
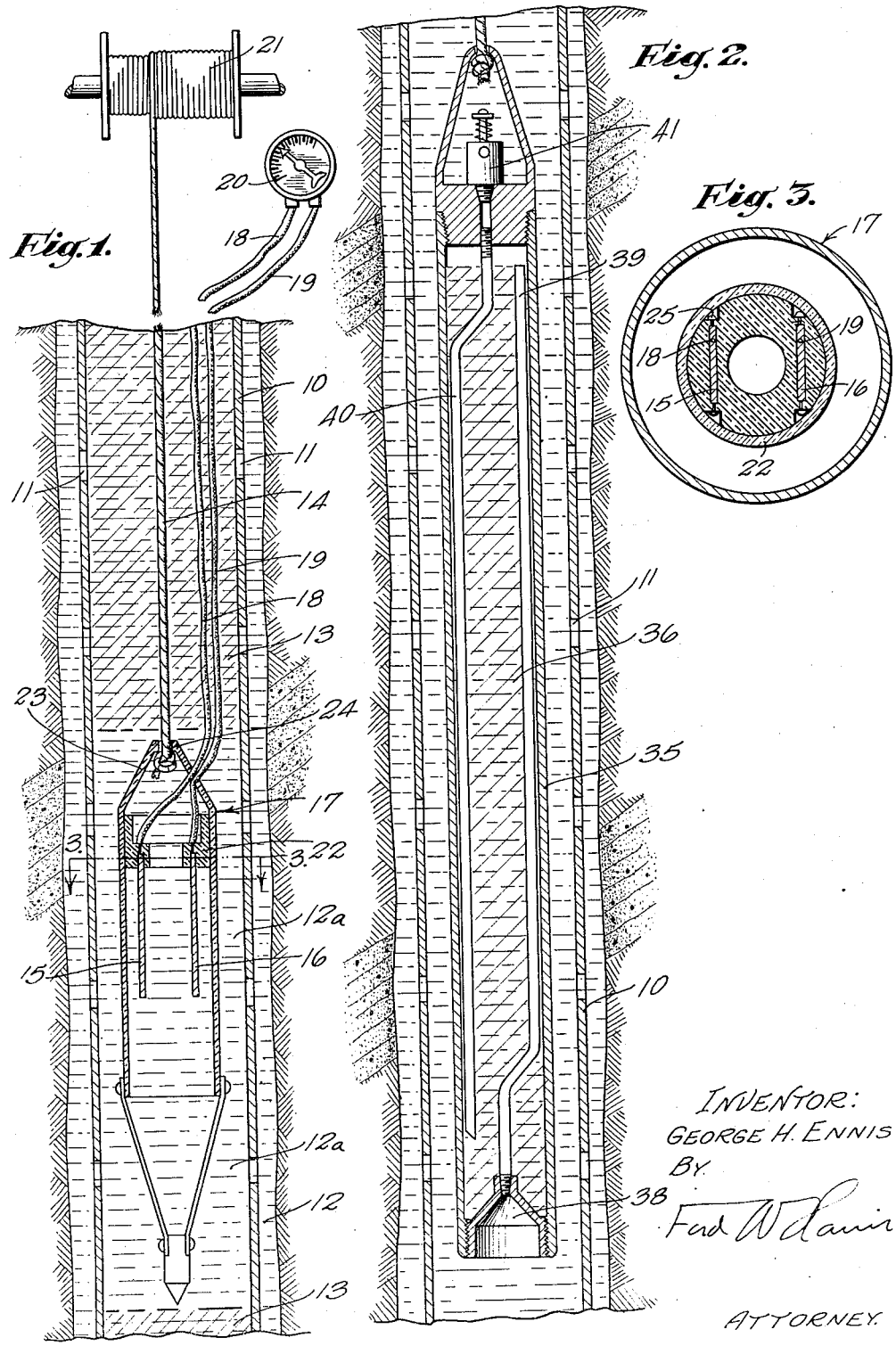
INVENTOR:
GEORGE H. ENNIS
BY
ATTORNEY.

Patented Mar. 19, 1935

1,994,762

UNITED STATES PATENT OFFICE 1,994,762

ELECTROLYTE FOR USE IN TESTING WELLS

George H. Ennis, Long Beach, Calif., assignor of one-half to Robert V. Funk, Long Beach, Calif.

Original application June 3, 1929, Serial No. 367,913, now Patent No. 1,865,847. Divided and this application June 13, 1931, Serial No. 544,207. Renewed December 31, 1934.

20 Claims. (Cl. 175—183)

This invention relates to a testing solution for use in locating the point of entry of connate water into wells so that the point of leakage may be very accurately determined.

One of the objects of my invention is to produce a testing solution for use in testing oil wells which contains a strong electrolyte.

Another object of my invention is to produce an electrolyte having a viscosity at least as high as that of ordinary well water.

Another object of my invention is to produce a testing solution containing a strong electrolyte and of relatively high viscosity.

It is also an object of my invention to produce an electrolyte of the proper density.

Another object of my invention is to produce an electrolyte of acid character containing a soluble organic compound uniformly distributed therein.

This application is a division of my copending application entitled "Method and apparatus for locating the point of entry of water into oil wells", Serial No. 367,913, filed June 3, 1929, now Patent No. 1,865,847.

This application discloses and claims the use of superior testing solutions for use in locating the point of entry of connate water into wells. The testing solutions are particularly adapted to be used in connection with the method disclosed in my copending application, Serial No. 367,913, mentioned above, but may also be used in connection with any other suitable process.

As disclosed in my copending application, Serial No. 367,913, I prefer to deposit the testing solution in the well as a unitary body or "batch", which does not dilute the liquid in the well, but displaces it. To perform this part of my invention, I use the dose distributor of my patent entitled "Dose distributor", No. 1,725,979, in which patent the method of using the dose distributor is fully disclosed. This particular method of placing a testing solution in the well has many advantages, one of which is that no consideration need be given to the character of the liquid already in the well. In those methods in which the chemical is distributed throughout the liquid in the well different chemicals might be required to suit different liquids, and where the well is partly filled with oil, the oil must be removed because the chemical will not mix with it to form the desired testing solution.

After the testing solution has been deposited in the well the hydrostatic head in the well is reduced, which reduces the pressure on the formation and allows the connate liquid, which is usually fresh water or salt water, to seep or leak into the well. This leakage into the well dilutes the testing solution and forms a separating layer between the upper and lower parts thereof. The next step in the process is to test the testing solution to determine the point at which it is diluted which indicates the point at which leakage occurs. I prefer to accomplish this testing step of my invention by lowering a pair of galvanic plates into the well, which plates are connected in circuit with a suitable millivoltmeter. When the plates enter the testing solution, which is the subject of this application, they cooperate therewith to form a voltaic cell. The potential produced by this voltaic cell will depend upon the concentration of the testing solution, and where the testing solution is diluted the potential produced will be less than that of the normal testing solution. By watching the millivoltmeter, it will be noted when the potential drops off, and the operator will then know the level at which the leakage has occurred.

Other objects and particular features of my invention will be explained later.

Fig. 1 shows a sectional elevation of a well in which the third electrical measuring step is being taken.

Fig. 2 shows a sectional view within a well of a dose distributor which I may use to distribute the testing solution within the well.

Fig. 3 is a sectional view taken on the line 3—3 of Fig. 1.

In Fig. 1, 10 represents a well casing in which there are openings 11 allowing underground water 12 to leak in. Water that has found such an ingress into the casing is designated by the numeral 12a. The cross-hatched areas 13 represent a body of testing solution which has been deposited in the well. Suspended by cable 14 upon which graduations are marked, are metallic plates 15 and 16, held at fixed distance apart by an insulating holder 17. The plates are connected through insulated wires 18 and 19 respectively to a millivoltmeter 20 above the surface of the earth. A cable reel or winch 21 is preferably provided to raise and lower the electrode plates. The cable is preferably coated especially near the electrodes with some non-conducting composition.

Referring particularly to Fig. 2, the dose distributor includes a shell 35 providing a chamber 36. At the lower end of the chamber 36 is a mouth 38 connected to the interior of the chamber by means of an inlet pipe 39 which extends to the upper end of the chamber. Connected to the upper end of the shell 35 is an outlet pipe 40 which extends, as shown, to the lower end of the chamber 36. Associated with the passage of the outlet pipe 40 is a valve 41. The details of construction of this type of dose distributor are clearly shown in my patent for Dose distributor, and the details thereof are for this reason not given herein.

In Fig. 3, 15 indicates the electronegative metallic plate made preferably of 16-carat gold, while 16 indicates the electropositive plate made preferably of amalgamated zinc. The plates are held in fixed spacial relation to each other by an insulating ring 22 with which a bail 23 is integral. The wires 18 and 19 are indicated in cross section. The bail 23 may be provided with a hole 24 or a hook to facilitate the attachment of the cable 14. Screws or pins 25 may be provided to hold the plates in the ring. The screws should either be made of the same material as the plate, which they hold, or of insulating material. The ring may be recessed to accommodate the plates and hold them rigid.

Gold and zinc are not the only materials which are suitable for the electrode plates. Those which may be used are:

| Column 1 | Column 2 | Column 3 |
| --- | --- | --- |
| The metals in this column may be used as electropositive plates to those in Columns 2 or 3. | The metals in this column may be used as electronegative plates to those in Column 1 or as electropositive plates to those in Column 3. | Electronegative plates. |
| Aluminum<br>Chromium<br>Manganese<br>Zinc<br>Iron<br>Cobalt | Nickel<br>Lead<br>Cadmium<br>Tin<br>Copper<br>Silver<br>Antimony<br>Gold | Platinum<br>Carbon |

In locating the point of entry of connate water into the well, the potential created by the metallic plates and the liquid contained in the well is first determined by lowering the galvanic plates 15 and 16 into the well. An average of the readings of the millivoltmeter at different levels may be taken although the variations will seldom be found to be large. The treating solution is then introduced into the well by using the dose distributor disclosed in my Patent No. 1,725,979 and is introduced by the following method. The testing solution is placed in the chamber 36 as illustrated in Fig. 2 and the valve 41 is closed. The dose distributor is then lowered into the well to a depth where it is believed that the leakage occurs, and a sudden or quick jerk is given on the lowering rope which opens the valve 41. This opens the outlet 40 and permits the treating solution to be forced from the chamber 36.

This is accomplished as follows:

It will be seen that the mouth 38 is quite large and the space around the dose distributor is relatively small so that when the dose distributor is lowered a pressure is created below the dose distributor, and this pressure will cause the liquid in the well to flow inward through the mouth 38 and inlet pipe 39 into the upper end of the chamber. A pressure is of course at this time placed on the treating solution in the chamber 36 and the treating solution is forced from the chamber 36 through the outlet pipe 40. Therefore, it will be seen that when the treating solution has been forced from the dose distributor, the dose distributor has been filled with the liquid from the well. For this reason the hydrostatic head of the well is not increased or decreased, but the only action which has taken place is that a unitary body of treating solution has been deposited in the well at a desired depth. This method enables the depositing of bodies or masses of treating solution without any consideration being given to the qualities of the liquids in the well and without changing the hydrostatic condition of the well.

The testing solution of my invention has electrochemical qualities; in other words, it is an electrolyte. One of my preferred testing solutions contains ammonium sulfate, sodium sulfate and colloidal material in solution which is acid with sulfuric acid and chromic acid. The colloidal material may be an alcoholic fermentation product of waste molasses after the removal of the alcohol therefrom, which material is technically known as "slop". I make my solution as follows:

1—*Slop solution*

(A) Take 10 gallons of concentrated slop. (B) Take 5 gallons of water and add gradually ¾ gallon of sulfuric acid 66 degrees Bé. (C) Mix A and B and bring to boil, heat for ½ hour, let stand 12 hours. Siphon off 10 gallons.

2—*Ammonium sulfate solution*

Dissolve 300# of ammonium sulfate (fertilizer grade 25% ammonia) in 60 gallons of cold water.

3—*Sodium bichromate solution*

3½ parts (by weight) water, 3 parts (by weight) sodium bichromate, 1 part (by weight) 66 degrees Bé. sulfuric acid.

*Mixing*

(A) Take 90 gallons of ammonium sulfate solution #2, add to this 10 gallons of slop solution #1 which will make up 100 gallons of A solution. Make up 150 gallons of sodium bichromate or B solution. Mix 4 parts by volume of A solution and 6 parts of B solution making 250 gallons of chemical solution to be distributed in fluid contents of well by patented dose distributor.

The object in using colloidal material in the above solution is to give the solution sufficient viscosity to cause it to remain in the position in the well where it is placed; in other words, so that it will not diffuse rapidly. The colloidal material may be dispensed with if desired. Unfermented molasses, other saccharine materials, and starch solutions may also be used.

The potential created by the immersion of one set of galvanic plates in the original water of the well having been determined, and the electrochemical testing solution having been deposited in the well, the potential created by the same set of galvanic plates in the electrochemical testing solution is now determined by lowering the galvanic plates into the testing solution in the well. A number of determinations of the potential created by the galvanic plates and the electrochemical testing solution may be taken for very accurate work.

The hydrostatic head of liquid in the well is then diminished by swabbing or bailing. The amount of liquid to be taken out will of course vary with the rate at which the water is coming in from the outside. It is preferred not to lower the fluid level but slightly below the normal fluid level.

It is the intention of the inventor to so arrange his liquids in the well at the time the final reading is taken that there will be a stratum of from 3 to 15 feet of untreated water between two strata of solution, said strata being of substantial height. Persons skilled in oil well work will know how to do this.

It is not necessary to wait until such a condition is brought about, however. The electrode plates may be lowered several times through the column of liquid in the well. As soon as any material fluctuation of the voltage reading on the millivoltmeter occurs, it will be known that the electrodes have passed from the solution to the water or vice versa according to whether the voltage reading has decreased or increased. One boundary of the two liquids having been thus located, it is a simple matter to locate the other boundary. In all these measurements the amount of cable paid out is accurately measured by the graduations upon it so that the height of the water column is easily computed. Midway between the two boundaries of the water column may be assumed to be the place where most of the water is coming in, and such condition is, in fact, most often the case. The depth of such point, as read from the cable or computed, locates the leak with considerable exactness.

In a modification of my process I prefer to allow the testing solution to disperse through the water in the well, instead of using the "batch" method of introducing the testing solution into the well. From the foregoing description of using the "batch" method, the operation of this modification will be clearly understood by skilled chemical engineers and will not be described herein.

Using gold and amalgamated zinc plates the potential developed is approximately 1.40 volts when my preferred solution is dispersed in the approximate ratio of one-gallon solution to 48 gallons of water or salt water in the well. The same galvanic plates lowered in salt water of the concentration usually found in oil wells in California produce a potential of approximately 0.35 volts. In fresh water the said galvanic plates produce a potential of approximately 0.2 volts and in distilled water no potential is produced.

Although I have described my invention with respect to certain particular embodiments thereof, nevertheless I do not desire to be limited to the particular details shown and described except as clearly specified in the appended claims, since many changes, modifications and substitutions may be made without departing from my invention in its broader aspects and my invention in its broader aspects may be found useful in many other applications thereof.

I claim as my invention:

1. A testing solution for use in oil wells containing a strong electrolyte and a dealcoholized molasses slop.

2. An electrolyte comprising dealcoholized molasses slop, sodium sulfate, ammonium sulfate, and a strong acid.

3. An electrolyte comprising dealcoholized molasses slop, sodium sulfate, ammonium sulfate, and sulfuric and chromic acids.

4. A testing solution for use in wells containing a strong electrolyte and a liquid organic colloid of such a nature that it will impart the desired viscosity to said solution.

5. A testing solution for use in wells containing a strong electrolyte and a colloidal material of a carbonaceous nature uniformly distributed therein, said colloidal material being of such a nature that it will impart the desired viscosity to said testing solution.

6. A testing solution for use in wells containing a strong electrolyte and a soluble organic compound uniformly distributed therein, said soluble organic compound being of such a nature that it will impart the desired viscosity to said testing solution.

7. A testing solution for use in wells containing a strong electrolyte, and a colloidal material mixed therewith which is of such a nature that it will impart the desired viscosity to said testing solution.

8. A testing solution for use in wells containing a strong electrolyte, a liquid organic colloid of such a nature that it will impart the desired viscosity to said testing solution, and chromic and sulfuric acids.

9. A testing solution containing chromic and sulfuric acids, and colloidal material of a carbonaceous nature uniformly distributed therein, said colloidal material being of such a nature that it will impart the desired viscosity to said testing solution.

10. An electrolyte of acid character comprising a liquid organic colloid of such a nature that it will impart the desired viscosity to said electrolyte, a highly ionized neutral inorganic salt, a salt of acid character, and a strong acid.

11. A testing solution for use in wells containing a strong electrolyte and a liquid organic colloid of such a nature that it will render said testing solution sufficiently viscous so that it will remain substantially where it is placed in said well.

12. A testing solution for use in wells containing a strong electrolyte and a colloidal material of a carbonaceous nature uniformly distributed therein, said colloidal material being of such a nature that it will render said testing solution sufficiently viscous so that it will remain substantially where it is placed in said well.

13. A testing solution for use in wells containing a strong electrolyte and a soluble organic compound uniformly distributed therein, said soluble organic compound being of such a nature that it will render said testing solution sufficiently viscous so that it will remain substantially where it is placed in said well.

14. A testing solution for use in wells containing a strong electrolyte, and a colloidal material mixed therewith which is of such a nature that it will render said testing solution sufficiently viscous so that it will remain substantially where it is placed in said well.

15. A testing solution for use in wells containing a strong electrolyte, a liquid organic colloid of such a nature that it will render said testing solution sufficiently viscous so that it will remain substantially where it is placed in said well, and chromic and sulfuric acids.

16. A solution for use in wells containing chromic and sulfuric acids, and colloidal material of a carbonaceous nature uniformly distributed therein, said colloidal material being of such a nature that it will render said solution sufficiently viscous so that it will remain substantially where it is placed in said well.

17. An electrolyte of acid character comprising a liquid organic colloid of such a nature that it will render said electrolyte sufficiently viscous so that it will remain substantially where it is placed in the well, a highly ionized neutral inorganic salt, a salt of acid character, and a strong acid.

18. A testing solution for use in wells containing a strong electrolyte and a colloidal material of a carbonaceous nature uniformly distributed therein, said colloidal material being of such a nature that it will render said testing solution sufficiently viscous so that it will not diffuse rapidly in said well.

19. A testing solution for use in wells containing a strong electrolyte and a soluble organic compound uniformly distributed therein, said soluble organic compound being of such a nature that it will render said testing solution sufficiently viscous so that it will not diffuse rapidly in said well.

20. A testing solution for use in wells containing a strong electrolyte, and a colloidal material mixed therewith which is of such a nature that it will render said testing solution sufficiently viscous so that it will not diffuse rapidly in said well.

GEORGE H. ENNIS.